Jan. 1, 1952
G. E. HENNING
2,581,255
CONTINUOUS VULCANIZING METHOD AND APPARATUS
Filed Sept. 23, 1948
2 SHEETS—SHEET 1
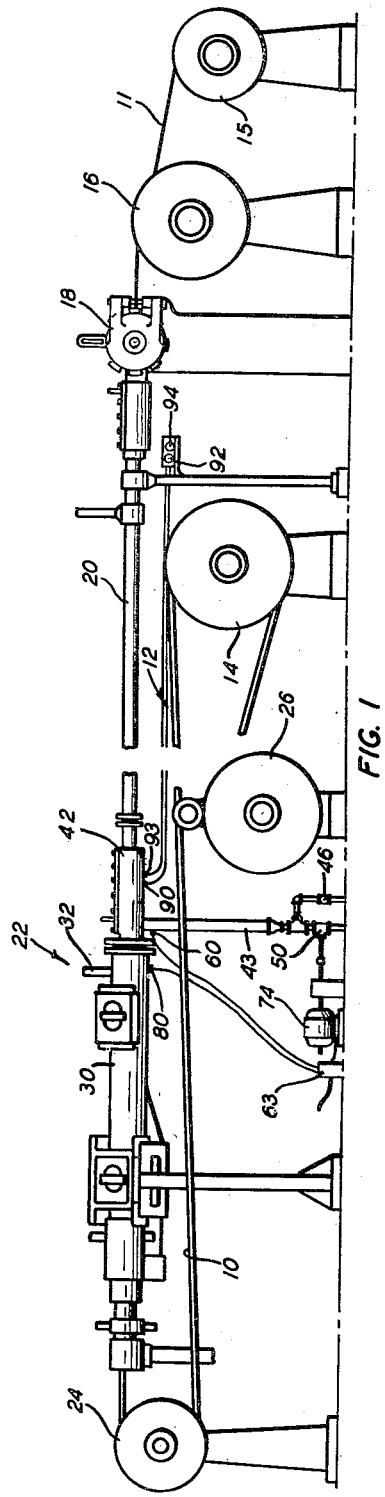
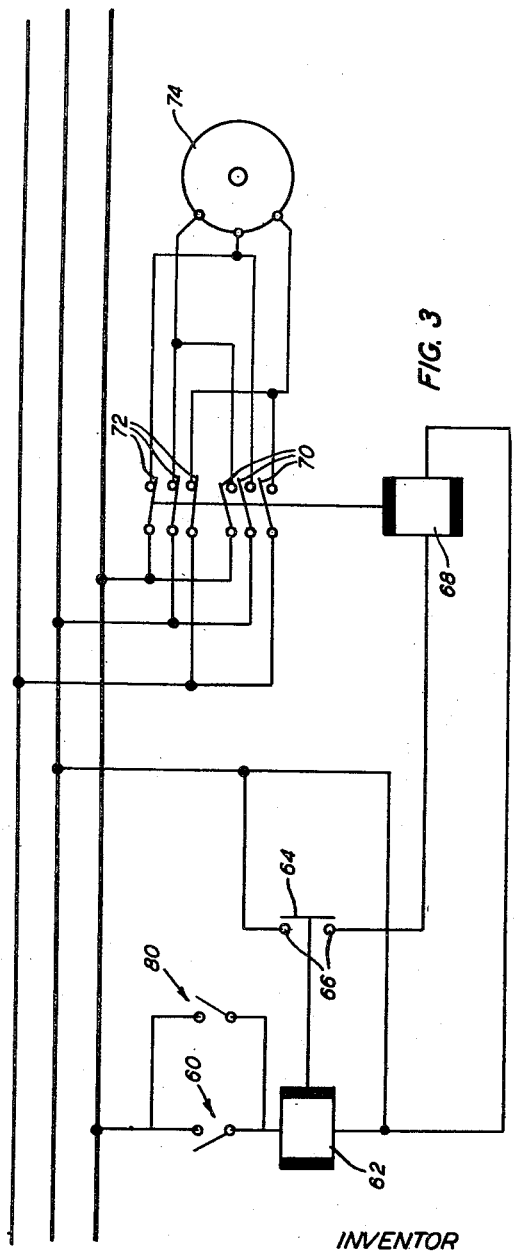
INVENTOR
G. E. HENNING
BY C. H. Nanz
ATTORNEY

INVENTOR
G. E. HENNING
BY
ATTORNEY

Patented Jan. 1, 1952

2,581,255

UNITED STATES PATENT OFFICE 2,581,255

CONTINUOUS VULCANIZING METHOD AND APPARATUS

George E. Henning, Baltimore, Md., assignor to Western Electric Company, Incorporated, New York, N. Y., a corporation of New York Application September 23, 1948, Serial No. 50,773

19 Claims. (Cl. 18—6)

This invention relates to continuous vulcanizing methods and apparatus, and more particularly to methods of and apparatus for continuously vulcanizing coverings composed of vulcanizable material on conductive cores.

In the manufacture of filamentary articles, such as insulated and jacketed conductors and cables having outer coverings of vulcanized compounds around suitable cores, cooling and sealing devices sometimes are placed at the ends of vulcanizing tubes and water is introduced into the cooling and sealing devices to cool the covered articles to prevent blisterings of the covering thereover. Two types of connections between the vulcanizing tubes and the cooling and sealing devices have been used in the past. In one of these types, a mechanical seal has been placed between the cooling and sealing device and the vulcanizing tube. The mechanical seal sometimes has been unsatisfactory because it may abrade the coverings advanced therethrough and because of maintenance problems. In the other type, the cooling and sealing device is connected in tandem with and in communication with the vulcanizing tube. However, in the latter type of apparatus, the pressures of the vulcanizing medium in the vulcanizing tube and the cooling medium in the cooling and sealing device must be kept quite close to prevent flooding of the vulcanizing tube by the cooling medium or flooding of the cooling and sealing device with the vulcanizing medium.

An object of the invention is to provide new and improved continuous vulcanizing methods and apparatus.

A further object of the invention is to provide new and improved continuous vulcanizing methods and apparatus, in which flooding of the vulcanizing tube with the cooling medium from a cooling and sealing device is prevented.

A method illustrating certain features of the invention may include steps of introducing a vulcanizing medium into a vulcanizing zone, introducing a cooling medium into a cooling zone in tandem with the vulcanizing zone, and draining off at the juncture of the vulcanizing zone with the cooling and sealing zone either the vulcanizing medium or the cooling and sealing medium when that medium is under a higher pressure than the other medium to maintain the zones distinct.

An apparatus illustrating certain features of the invention may include a vulcanizing tube, a cooling and sealing tube joined to the exit of the vulcanizing tube, a drain located in the juncture of the sealing and vulcanizing tube, a valve in the drain, and means operable at a predetermined temperature of combined cooling water and condensate for actuating the valve.

A complete understanding of the invention may be obtained from the following description of a method and apparatus forming specific embodiments thereof, when read in conjunction with the appended drawings, in which:

Fig. 1 is a fragmentary side elevation of an apparatus forming one embodiment of the invention;

Fig. 3 is a diagrammatic view of a control circuit for the apparatus shown in Fig. 1.

Figure 2:
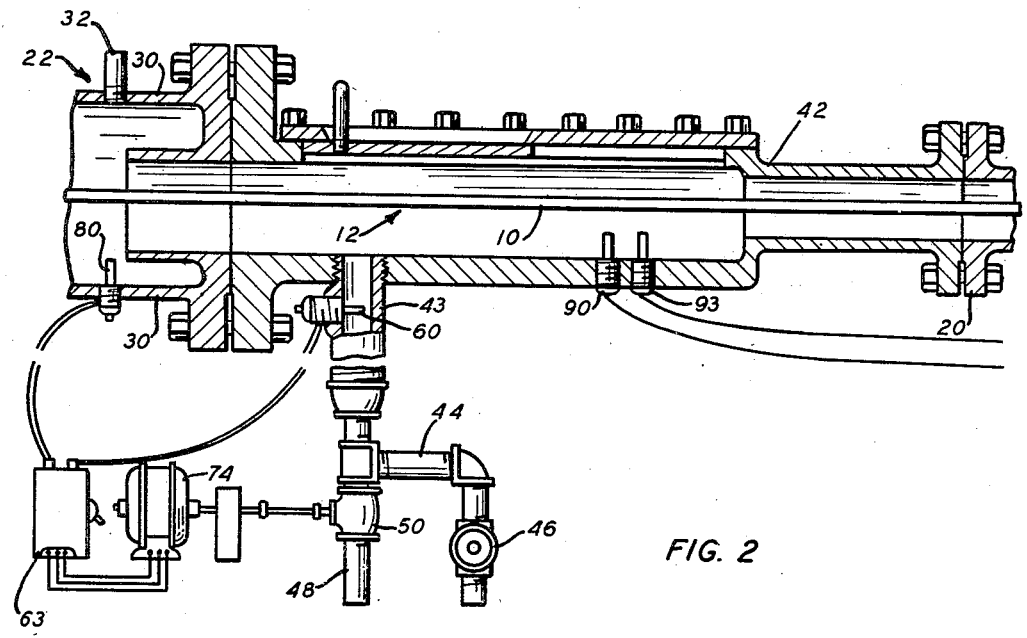
Fig. 2 is a fragmentary, enlarged, vertical section of a portion of the apparatus shown in Fig. 1.

Referring now in detail to the drawings, there is shown therein a continuous extruding and vulcanizing apparatus for forming and vulcanizing a protective covering 10 around a conductive core 11 to form a covered conductor 12. The core 11 may include air and hygroscopic elements so that the covered conductor 12 must be cooled after vulcanization of the covering 10 to prevent blistering from heated air and moisture enclosed within the covering. In forming the covering 10, the core 11 is advanced continuously by means of a takeup capstan 14 from a supply reel 15 at a high rate of speed over a supply capstan 16, through an extruder 18 which forms the covering 10 upon the core 11, through an elongated vulcanizing tube 20 into which steam under high pressure and at a high temperature is introduced to vulcanize the covering 10, through a cooling and sealing device 22, into which cold water under high pressure is introduced to cool the covered conductor 12, and around a return sheave 24 to a takeup reel 26.

The steam introduced into the vulcanizing tube 20 vulcanizes the covering 10 through heat and pressure, and the cold water introduced into a cylinder 30 of the cooling and sealing device 22 through an inlet pipe 32 cools the covered conductor 12, and maintains the covered conductor 12 under pressure to prevent blistering of the covering 10 until the internal pressure of air and moisture enclosed within the covering is reduced to pressure at which blistering will not occur. The pressure of the steam introduced into the vulcanizing tube 20 and the cold water introduced into the cylinder 30 of the cooling and sealing device 22 may be kept approximately equal by suitable means (not shown), such as independent pressure-controlling valves for holding the pressure of each approximately at the desired pressure, or a device tending to maintain the pressure of the water equal to that of the steam. Suitable examples of the latter are disclosed and claimed in copending applications Serial No. 702,-601, filed October 11, 1946, by A. Stiegler for "Continuous Extruding and Vulcanizing Apparatus," now Patent No. 2,540,479 and Serial No. 34,056, filed June 19, 1948, by G. E. Berggren for "Continuous Vulcanizing Methods and Apparatus."

A splice box 42 connecting the vulcanizing tube 20 to the cooling and sealing device 22 provides an unobstructed passage between the vulcanizing tube 20 and the cooling and sealing device 22 so that there is no abrasion of the covering as it is advanced from the vulcanizing tube to the cooling and sealing device. A drain pipe 43 leads from the bottom of the splice box 42, and a pipeline 44 including a restrictive valve 46 is connected to the pipe 43. A second pipeline 48 having a self-flushing needle valve 50 therein also is connected to the drain pipe 43. The valve 46 serves to permit only the normal flow of condensate from the vulcanizing tube 10 therethrough and any small amount of cooling water, which may enter the splice box 42 during normal operation.

When the pressure of the water in the cooling and sealing device 22 is higher than that of the steam in the vulcanizing tube 20, there is danger of partially or completely flooding the vulcanizing tube 20 with cold water. When this condition exists, the cold water enters the drain pipe 43 in a much larger proportion with respect to the steam condensate than under normal balanced pressure operation. Under these conditions a normally open, adjustable thermostatic switch 60 of a well known type positioned in the splice box near the drain pipe 43 is cooled so that it closes. A suitable switch for this purpose is shown in "Catalog Section 45" of the 1939 catalog of Fenwal, Incorporated of Ashland, Massachusetts.

When the thermostatic switch 60 is closed, a relay winding 62 in a control box 63 (Fig. 2) is energized to move a contactor 64 (Fig. 3) into engagement with contacts 66—66. This closes a circuit to a relay winding 68 thereby energizing the winding 68, which closes relay contacts 70—70 and opens relay contacts 72—72. Opening of the contacts 72—72 and closing the contacts 70—70 reverses a reversible torque motor 74 from action in a direction closing the valve 50 to action in a direction opening the valve 50. The opened valve 50 permits the cold water entering the splice box 42 to be drained away through the pipe 43 until the pressures are balanced and the cold water in the splice box has been drained therefrom. Thus, even partial flooding of the vulcanizing tube 20 by cold water is prevented.

When the cooling water and condensate enter the drain pipe 43 in their normal proportions, the increase in temperature of the water and condensate heats the thermostatic switch 60 to its normal operating temperature and the switch 60 opens. This deenergizes the relay windings 62 and 68 sequentially to permit contacts 72—72 to close and contacts 70—70 to open automatically. Closing of the contacts 72—72 causes the motor 74 to close the valve 50 and maintain it in a closed condition. Thus, the valve 50 and the controlling elements therefor prevent any flooding of the vulcanizing tube 20 with cold water.

A second normally open, adjustable thermostatic switch 80 similar to the switch 60 and closable by a temperature considerably higher than the desired temperature of the mixture of cooling water and condensate being drained is positioned in the cylinder 30 near the drain pipe 43. The switch 80 is connected in parallel with the switch 60 and in series with the relay winding 62. When there is danger of steam entering the cooling and sealing device because the steam is under too high a pressure with respect to that of the water, the steam pushes the water in the cylinder 30 back slightly and heats the switch 80, which then closes. Closing of the switch 80 operates to open the valve 50 to reduce the pressure of the steam near the exit end of the vulcanizing tube, thereby preventing the steam from pushing the water out of the cooling and sealing device 22.

The steam may be introduced into the vulcanizing tube at any desired pressure between about 150 pounds per square inch and about 400 pounds per square inch and at the corresponding temperature, and the water is introduced into the cooling and sealing device at approximately the same pressure as the steam at ordinary tap water temperature, which is usually below 80° F. With steam at a pressure of about 250 pounds per square inch and at a temperature of around 405° F., and cooling water at an initial temperature of 60° F., the switch 60 closes when it is cooled to a temperature of about 290° F. and opens when it is heated to a temperature of about 300° F. The switch 80 closes when it is heated to a temperature of about 80° F. and opens when it is cooled to a temperature of about 70° F.

A thermostatic switch 90 (Fig. 2) in the splice box 42 closes a circuit to a warning lamp 92 and a thermostatic switch 93 opens a circuit to a normal operation lamp 94 when there is danger of flooding the vulcanizing tube 20. Darkening of the lamp 94 and illumination of the lamp 92 indicate abnormal operating conditions in which there is danger of partially flooding the vulcanizing tube with the cooling water.

The vulcanizing tube 20 and the cooling and sealing device 22 have been described as separate elements for the purpose of simplifying the specification and for emphasizing the particular function each element performs in the treatment of the covered conductor 12. The vulcanizing tube 20 comprises a plurality of lengths of pipe secured together in tandem to form a vulcanizing tube having a predetermined length, and the cooling and sealing device is in tandem therewith. Since this assembly of these elements provides a continuous chamber in which the conductor is enclosed from the time it leaves the extruding head 16 until it emerges from the cooling and sealing device, the entire assembly may be considered a single tube having a steam-filled portion of sufficient length to vulcanize the covering 10 and a water filled portion of sufficient length to cool the covering before it emerges into the atmosphere.

Figure 4:
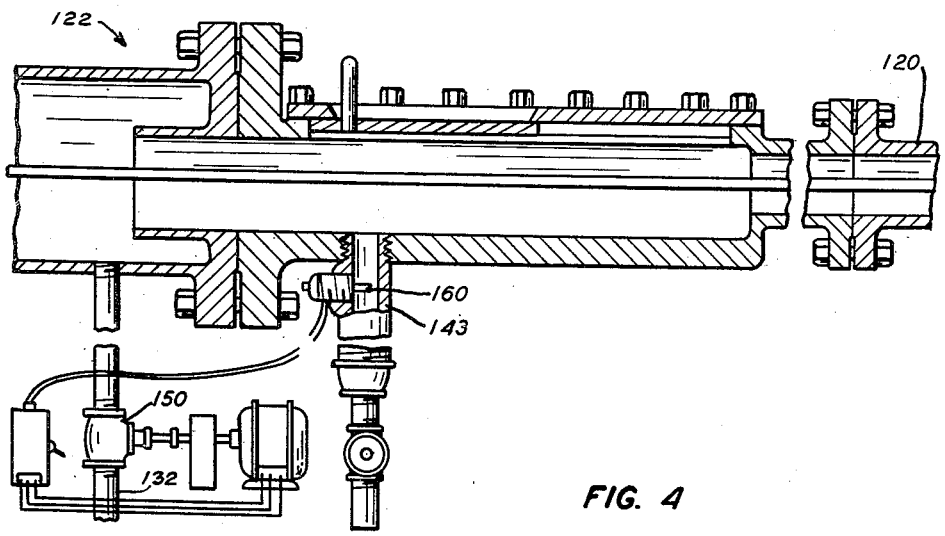
Fig. 4 is a fragmentary enlarged, fragmentary vertical section of an apparatus forming another embodiment of the invention.

An apparatus forming an alternative embodiment of the invention shown in Fig. 4 is identical with that shown in Figs. 1 to 3, inclusive, except that instead of placing a control valve, such as the valve 50, in the drain line, a valve 150 (Fig. 4) is positioned in a water supply line 132, and is operated oppositely with respect to the operation of the valve 50. The valve 150 is throttled down by closing of an adjustable, thermostatic switch 160 when there is danger of any flooding of the vulcanizing tube 120 with cold water to reduce the pressure of the water in the cooling and sealing device, and is opened when the proportion of cold water and condensate in a drain pipe 143 is correct. The valve 150 may be of a type which closes down completely, or may be of a type which throttles down somewhat but does not close completely.

With an operating temperature of about 405° F. of the steam and cooling water at a temperature of about 60° F. as it is introduced into a cooling and sealing device 122, the switch 160 is closed when its temperature is reduced to about 290° F. or below and is opened when it is heated to a temperature above 300° F.

What is claimed is:

1. In the vulcanization of a continuous article wherein the article is advanced through an elongated chamber having a steam filled zone near the entrance end and a cooling water filled zone near the exit end thereof, the method of maintaining said zones distinct which comprises the steps of measuring the temperature at a predetermined point near the juncture of said zones, and selectively withdrawing water and steam from the chamber in accordance with the temperature measured, whereby water will be withdrawn before it enters the steam filled zone and steam will be withdrawn before it enters the water filled zone.

2. In the vulcanization of a continuous article wherein the article is advanced through an elongated vulcanizing zone containing steam under high pressure and thence through an adjoining elongated cooling and sealing zone containing water under high pressure, the method of maintaining said zones distinct which comprises the steps of measuring the temperatures at predetermined points near the juncture of said zones, withdrawing water and steam from the juncture of said zones at a predetermined rate corresponding with predetermined measured temperatures, and selectively increasing the rate of withdrawal from said juncture in accordance with changes from said predetermined measured temperatures, whereby water will be withdrawn before it enters the vulcanizing zone and steam will be withdrawn before it enters the cooling zone.

3. The method of forming vulcanized articles, which comprises forming a filamentary article, advancing seriatim the article through an elongated vulcanizing zone and an elongated cooling and sealing zone in tandem with the vulcanizing zone, introducing steam under a high pressure into the vulcanizing zone, introducing cold water under a high pressure into the cooling and sealing zone, measuring the temperature at a point near the juncture of said zones, and reducing the introduction of water into the cooling and sealing zone when the water enters the vulcanizing zone in accordance with changes in the temperature measured.

4. The process for the vulcanization of a vulcanizable covering surrounding a continuously advancing core, which comprises passing the covered core through an elongated treating zone, subjecting the advancing core to a high pressure, high temperature fluid within the initial portion of the treating zone encountered by the advancing core to vulcanize the covering thereon, subjecting the advancing core to a low temperature fluid within a next succeeding portion of the treating zone to cool the vulcanized covering before the core emerges from the treating zone into the atmosphere, said vulcanizing fluid and cooling fluid having a junction point normally at a given point in the treating zone, maintaining the pressures of the vulcanizing fluid and the cooling fluid substantially in equilibrium, discharging the mixed fluid forming at the junction point from that portion of the treating zone, and controlling the rate of discharge of the mixed fluid from the treating zone in accordance with the temperature of the mixed fluids at a point adjacent to the junction point of the fluids.

5. An apparatus for forming vulcanized articles, which comprises a vulcanizing tube, means for supplying steam to the vulcanizing tube, a cooling and sealing tube joined to the exit end of the vulcanizing tube, means for supplying water to the cooling and sealing tube, a drain located near the juncture of the cooling and sealing tube and the vulcanizing tube, a valve in the drain, and temperature-responsive means located at one of said tubes and drain and operable at a predetermined temperature of combined cooling water and condensate for regulating the opening of the valve.

6. An apparatus for forming vulcanized articles, which comprises an elongated vulcanizing tube, a cooling and sealing tube connected to the exit end of the vulcanizing tube, the juncture between the vulcanizing tube and cooling and sealing tube being unobstructed, a drain positioned at the juncture of the cooling and sealing tube and the vulcanizing tube, a valve in the drain, a reversible electric motor for opening and closing the valve, and heat-responsive means positioned near the juncture of the tube for actuating the motor to open the valve when the temperature of the water and the steam flowing through the drain is below a predetermined value.

7. An apparatus for forming vulcanized articles, which comprises a vulcanizing tube, means for supplying steam to the vulcanizing tube, a cooling and sealing tube joined to the exit end of the vulcanizing tube, means for supplying cooling water to the cooling and sealing tube, a drain located near the juncture of the cooling and sealing tube and vulcanizing tube, a valve in the drain, and means operable at a predetermined temperature of combined cooling water and condensate and located near the juncture of the cooling and sealing tube and the vulcanizing tube for opening the valve.

8. An apparatus for forming vulcanized articles, which comprises a vulcanizing tube, a cooling and sealing tube positioned in tandem with the vulcanizing tube, means for advancing an article continuously from the vulcanizing tube into and through the cooling and sealing tube, a steam supply line for introducing steam under a high and fluctuating pressure into the vulcanizing tube, a water supply line for introducing cold water under a high and fluctuating temperature to the cooling and sealing tube, a drain for withdrawing water and steam from said tubes near the juncture thereof, a valve positioned in one of the water supply line and the drain, and means responsive to temperature located in one of said tubes and the drain for regulating the opening of the valve.

9. An apparatus for forming vulcanized articles, which comprises a vulcanizing tube, a cooling and sealing tube positioned in tandem with the vulcanizing tube, means for advancing an article continuously from the vulcanizing tube into and through the cooling and sealing tube, a steam supply line for introducing steam under a high and fluctuating pressure into the vulcanizing tube, a water supply line for introducing cold water under a high and fluctuating temperature to the cooling and sealing tube, a valve positioned in the water supply line, and means responsive to temperature located near the juncture of the tubes for throttling the valve in the water supply line when there is danger of water flooding the vulcanizing tube.

10. An apparatus for forming vulcanized articles, which comprises a vulcanizing tube, a cooling and sealing tube positioned in tandem with the vulcanizing tube, means for advancing an article continuously from the vulcanizing tube into and through the cooling and sealing tube, a steam supply line for introducing steam under a high pressure into the vulcanizing tube, a water supply line for introducing cold water under a high pressure to the cooling and sealing tube, a drain for withdrawing water and steam from said tubes near the juncture thereof, a valve positioned in the water supply line, means for opening and closing the valve, and means responsive to temperature located near the juncture of the cooling and sealing tube, the vulcanizing tube and the drain for actuating the valve-opening-and-closing means.

11. An apparatus for forming vulcanized articles, which comprises a vulcanizing tube, a cooling and sealing tube positioned in tandem with the vulcanizing tube, means for advancing an article continuously from the vulcanizing tube into and through the cooling and sealing tube, a steam supply line for introducing steam under a high and fluctuating pressure into the vulcanizing tube, a water supply line for introducing cold water under a high and fluctuating pressure to the cooling and sealing tube, a drain for withdrawing water and steam from said tubes near the juncture thereof, a valve positioned in the water supply line, means for opening and for closing the valve, and means responsive to temperature located in the drain for actuating the valve-opening-and-closing means.

12. An apparatus for forming vulcanized articles, which comprises a vulcanizing tube, a cooling and sealing tube positioned in tandem with the vulcanizing tube, means for advancing an article continuously from the vulcanizing tube into and through the cooling and sealing tube, a steam supply line for introducing steam under a high and fluctuating pressure into the vulcanizing tube, a water supply line for introducing cold water under a high and fluctuating pressure to the cooling and sealing tube, a drain for withdrawing water and steam from said tubes near the juncture thereof, a valve positioned in one of the drain and water supply lines, means for opening and for closing the valve, and means responsive to temperature located near the juncture of the cooling and sealing tube, the vulcanizing tube and the drain for actuating the valve-opening-and-closing means.

13. An apparatus for the continuous vulcanization of a vulcanizable covering surrounding a continuously advancing core, which comprises an elongated vulcanizing tube, a cooling and sealing tube positioned in tandem with and joined to the vulcanizing tube, a steam supply line for introducing steam under a high pressure into the vulcanizing tube, a water supply line for introducing cold water under a high pressure into the cooling and sealing tube, a drain for withdrawing water and steam from said tubes near the juncture thereof, a valve positioned in the drain, means for regulating the valve, temperature responsive means located in the drain for actuating the valve regulating means to open the valve when the temperature near the temperature responsive means drops below a predetermined value, and temperature responsive means located in the cooling and sealing zone and near the juncture of said tubes for actuating the valve regulating means to open the valve when the temperature near the last-mentioned temperature responsive means rises above a predetermined value.

14. An apparatus for the continuous vulcanization of a vulcanizable covering surrounding a continuously advancing core, which comprises an elongated tube through which the covered core is adapted to pass continuously, means for supplying a high temperature, high pressure fluid to a portion of the tube first encountered by the advancing core to vulcanize the covering thereon, means for supplying a low temperature fluid to a portion of the tube subsequently encountered by the advancing core to cool the vulcanized covering before the core emerges into the atmosphere, said fluids having a junction point within the tube normally at a point intermediate the ends of the tube, means for measuring the temperatures at points near the junction point of the fluids within the tube, means for discharging the mixed fluids forming at the junction point from that portion of the tube, and means provided in the discharge means for controlling the rate of discharge of the mixed fluids from the junction point in accordance with the measured temperatures.

15. The method of forming vulcanized articles, which comprises continuously advancing a filamentary article through an elongated vulcanizing zone and through an elongated cooling and sealing zone in tandem with the vulcanizing zone, introducing steam under a high pressure into the vulcanizing zone, introducing cold water under a high pressure into the sealing zone, measuring the temperature at a point near the juncture of said zones, withdrawing water from the sealing zone at a predetermined rate of flow when the temperature at said point is a predetermined value, and withdrawing the water at an increased rate of flow when the temperature at said point is lower than said value.

16. The method of forming vulcanized articles, which comprises advancing a vulcanizable, filamentary article through an elongated vulcanizing zone and through an elongated cooling and sealing zone in tandem with the vulcanizing zone, introducing a hot vulcanizing medium under a high pressure into the vulcanizing zone, introducing a cold cooling and sealing medium at a high pressure into the cooling and sealing zone, measuring the temperature at a point near the juncture of said zones, forcing the cooling and sealing medium through the cooling and sealing zone at a predetermined rate of flow when the temperature at said point is a predetermined value, and forcing the cooling and sealing medium into the cooling and sealing zone at a rate of flow higher than the first-mentioned rate of flow when the temperature at said point is higher than said value.

17. The method of regulating an adjustable reducing valve in a water supply line to a cooling and sealing zone in communication with a vulcanizing zone having steam under pressure therein, which comprises continuously measuring the temperature at a point near the juncture of said zones, actuating the valve to a condition permitting water under a predetermined pressure to enter the cooling and sealing zone when the measured temperature is at a predetermined value indicating that said pressure of the water is equal to that of the steam, and throttling the valve in accordance with a decrease in the measured temperature.

18. The method of continuously forming vulcanized article, which comprises advancing a filamentary article through a vulcanizing zone and through a cooling and sealing zone in tandem therewith, forcing a vulcanizing fluid under a high pressure through the vulcanizing zone, forcing a cooling and sealing fluid through the cooling and sealing zone, measuring the temperature at a point near the juncture of the vulcanizing zone and the cooling and sealing zone, and adjusting the pressure of one of the fluids when the measured temperature indicates a condition of unbalanced pressures of the fluids.

19. The method of continuously forming vulcanized articles, which comprises advancing a filamentary article through a vulcanizing zone and through a cooling and sealing zone in tandem therewith, introducing steam under a high pressure into a vulcanizing zone, introducing water under a high pressure into the cooling and sealing zone, measuring the temperature at a point near the juncture of the zones, and adjusting the relative pressures of the water and the steam whenever the measured temperature indicates an unbalance in pressure.

GEORGE E. HENNING.

REFERENCES CITED

The following references are of record in the file of this patent:

UNITED STATES PATENTS

| Number | Name | Date |
|---|---|---|
| 2,069,087 | Forstrom et al. | Jan. 26, 1937 |
| 2,426,341 | Canfield | Aug. 26, 1947 |

FOREIGN PATENTS

| Number | Country | Date |
|---|---|---|
| 864,121 | France | Jan. 8, 1941 |